United States Patent
Suzuki et al.

(10) Patent No.: US 10,182,391 B2
(45) Date of Patent: Jan. 15, 2019

(54) SYSTEMS AND METHODS FOR MANAGING A UE-TO-NETWORK RELAY

(71) Applicant: BLACKBERRY LIMITED, Waterloo (CA)

(72) Inventors: Takashi Suzuki, Ichikawa (JP); Eswar Vutukuri, Havant (GB); Rene Faurie, Versailles (FR)

(73) Assignee: BlackBerry Limited, Waterloo (CA)

( * ) Notice: Subject to any disclaimer, the term of this patent is extended or adjusted under 35 U.S.C. 154(b) by 0 days.

(21) Appl. No.: 15/664,452

(22) Filed: Jul. 31, 2017

(65) Prior Publication Data

US 2017/0332311 A1    Nov. 16, 2017

Related U.S. Application Data

(63) Continuation of application No. 14/794,208, filed on Jul. 8, 2015, now Pat. No. 9,723,543.

(51) Int. Cl.
| | | |
|---|---|---|
| *H04W 48/10* | (2009.01) | |
| *H04W 24/04* | (2009.01) | |
| *H04B 7/155* | (2006.01) | |
| *H04W 8/00* | (2009.01) | |
| *H04W 48/12* | (2009.01) | |
| *H04W 84/04* | (2009.01) | |

(52) U.S. Cl.
CPC ........ *H04W 48/10* (2013.01); *H04B 7/15557* (2013.01); *H04W 8/005* (2013.01); *H04W 24/04* (2013.01); *H04W 48/12* (2013.01); *H04W 84/047* (2013.01)

(58) Field of Classification Search
None
See application file for complete search history.

(56) References Cited

U.S. PATENT DOCUMENTS

| | | | | |
|---|---|---|---|---|
| 2002/0187746 | A1* | 12/2002 | Cheng | H04W 40/22 455/11.1 |
| 2010/0167743 | A1* | 7/2010 | Palanki | H04B 7/155 455/436 |
| 2012/0093125 | A1* | 4/2012 | Hapsari | H04W 36/0016 370/331 |
| 2012/0182859 | A1* | 7/2012 | Ikeda | H04L 1/1835 370/216 |
| 2012/0282961 | A1* | 11/2012 | Bienas | H04W 24/00 455/507 |
| 2012/0327801 | A1* | 12/2012 | Seo | H04B 1/74 370/252 |
| 2013/0016649 | A1* | 1/2013 | Damnjanovic | H04W 88/04 370/315 |
| 2013/0044590 | A1* | 2/2013 | Lee | H04W 76/068 370/228 |
| 2013/0171986 | A1* | 7/2013 | Shimizu | H04B 7/155 455/423 |

(Continued)

*Primary Examiner* — Otis L Thompson, Jr.
(74) *Attorney, Agent, or Firm* — Ridout & Maybee LLP (57) ABSTRACT

Method and systems for managing a communication link. One or more indicators of an expected service interruption associated with a communication link is determined. The communication link may be a link between a relay and a communication target and/or a link between the relay and a user equipment (UE). In response, the UE initiates one or more actions to reduce or avoid the expected service interruption.

20 Claims, 9 Drawing Sheets

(56) References Cited

U.S. PATENT DOCUMENTS

| | | | | |
|---|---|---|---|---|
| 2013/0267223 | A1* | 10/2013 | Tajima | H04W 76/028 |
| | | | | 455/423 |
| 2014/0206354 | A1* | 7/2014 | Yasuoka | H04B 7/15 |
| | | | | 455/436 |
| 2015/0029866 | A1* | 1/2015 | Liao | H04W 4/023 |
| | | | | 370/241 |
| 2015/0045035 | A1* | 2/2015 | Nigam | H04W 36/30 |
| | | | | 455/436 |
| 2015/0282243 | A1* | 10/2015 | Lei | H04W 24/02 |
| | | | | 370/225 |
| 2015/0365872 | A1* | 12/2015 | Dudda | H04W 36/0055 |
| | | | | 455/436 |
| 2016/0088668 | A1* | 3/2016 | Kim | H04W 76/023 |
| | | | | 370/315 |
| 2016/0204847 | A1* | 7/2016 | Ryu | H04B 7/15507 |
| | | | | 455/7 |
| 2016/0212780 | A1* | 7/2016 | Stojanovski | H04W 76/14 |
| 2016/0285539 | A1* | 9/2016 | Sadiq | H04W 8/005 |
| 2016/0286374 | A1* | 9/2016 | Baghel | H04B 17/318 |
| 2016/0286590 | A1* | 9/2016 | Cheng | H04W 76/023 |
| 2016/0302127 | A1* | 10/2016 | Moon | H04W 76/028 |
| 2016/0337889 | A1* | 11/2016 | Jung | H04W 24/04 |
| 2017/0086114 | A1* | 3/2017 | Jung | H04W 36/08 |
| 2017/0111273 | A1* | 4/2017 | Kuge | H04L 69/22 |
| 2018/0035354 | A1* | 2/2018 | Martin | H04W 40/22 |

\* cited by examiner

```
-- ASN1START serviceDisruptionLikelyIndication-r13 ::=   SEQUENCE {
    criticalExtensions          CHOICE {
        c1                          CHOICE {
            serviceDisruptionLikelyIndication-r13       serviceDisruptionLikelyIndication-r13-IEs,
            spare3 NULL, spare2 NULL, spare1 NULL
        },
        criticalExtensionsFuture    SEQUENCE {}
    }
} serviceDisruptionLikelyIndication-r13-IEs ::= SEQUENCE {
    triggerCause-r13            ENUM{rlf, rsrqLow, edgeOfCoverage, reEstablishment, lowBattery,
                                serviceUnavailable, unrSwitchOff, relayModeStop, lowProcessingPower, spare2, ... spare8}
                                OPTIONAL,
    targetUnrsList  SEQUENCE (SIZE (1.. numTargUnrs)) ProseUeID-r13 OPTIONAL
    ...
}

ProseUeID-r13   :: = Choice {
                BIT STRING (SIZE (24)),    --- Layer-2 Prose Id of UNR
                physicalSLSSID
} physicalSLSSID  :: = INTEGER (0..335)
numTargUnrs     :: = INTEGER (8)

-- ASN1STOP
```

```
-- ASN1START unrStatusReport -r13      ::=   SEQUENCE {
    criticalExtensions              CHOICE {
        c1                              CHOICE {
            unrStatusReport-r13             unrStatusReport-r13-IEs,
            spare3 NULL, spare2 NULL, spare1 NULL
        },
        criticalExtensionsFuture        SEQUENCE {}
    }
} unrStatusReport-r13-IEs ::= SEQUENCE {
    uuParams ::= SEQUENCE {
        uuRsrq      RSRQ
        uuRsrp      RSRP
        uuCqi       CQI
        uuTputUl    ENUM{1Mbps, 2Mbps, 30Mbps, 60Mbps, 100Mbps, spare1, spare2, spare3}   OPTIONAL,
        uuTputDl    ENUM{1Mbps, 2Mbps, 30Mbps, 60Mbps, 100Mbps, spare1, spare2, spare3}   OPTIONAL,
    }
    unrParams ::= SEQUENCE {
        unrBatteryLev   ENUM{low, med, high, spare}                                       OPTIONAL,
    }
    targetUnrId-r13     ProseUeID           OPTIONAL
}
-- ASN1STOP
```

SYSTEMS AND METHODS FOR MANAGING A UE-TO-NETWORK RELAY

CROSS REFERENCE TO RELATED APPLICATIONS

The present application is a continuation of and claims priority to U.S. patent application Ser. No. 14/794,208, filed Jul. 8, 2015 the entirety of which is hereby incorporated by reference.

FIELD

The present disclosure is related to methods and systems for managing a UE-to-network relay. In various examples, the present disclosure is related to methods and systems for handling service continuity in a UE-to-network relay.

BACKGROUND

Device to Device (D2D) Proximity-based Services (ProSe) refer to a set of features supporting device to device communication in the Enhanced Packet System (EPS). ProSe features include ProSe Direct Discovery, which enables proximate devices to discover each other and the services proved by each other, and ProSe Direct Communication. ProSe features can be used for public safety applications (e.g. mission critical push to talk (MCPTT)) and/or for commercial applications.

ProSe Direct Communication is a mode of communication whereby user equipments (UEs) can communicate with each other directly over the PC5 (UE to UE) radio interface via direct air-interfaces between two devices (also referred to as sidelink channels). This may be in contrast to the radio interface between a UE and the base station (or the rest of the network), which may also be referred to as Uu.

For public safety-specific usage, ProSe Direct Communication is facilitated by the use of ProSe User-to-Network Relays (UNRs), which are UEs that act as relays between the network (e.g., an Evolved Universal Terrestrial Radio Access Network (E-UTRAN)) and one or more UEs not served by the network (e.g., to provide network based services to UEs which are out of network coverage). Also, ProSe Direct Communication between two UEs not served by the network and out of each other's transmission range may be facilitated by a ProSe UE-to-UE Relay (UUR).

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

In some examples, the present disclosure provides a method for managing a communication link. The method includes: detecting one or more indicators of an expected service interruption associated with at least one of: a communication link between a relay and a communication target; and a communication link between the relay and a first user equipment (UE); and causing a first message to be transmitted, the first message indicating that the expected service interruption is expected to occur; the first message causing the first UE to initiate one or more actions to reduce or avoid the expected service interruption.

In some examples, the present disclosure provides a method for managing a communication link. The method includes: receiving a status report providing information indicative of the quality of at least one of: a communication link between a relay and a communication target; and a communication link between the relay and a first user equipment (UE); determining whether a parameter included in the information falls below a predetermined threshold or fails to satisfy a predetermined criterion; when it is determined that the parameter is below the predetermined threshold or fails to satisfy the predetermined criterion, determining that a service interruption is expected and initiating one or more actions to reduce or avoid the service interruption.

In some examples, the present disclosure provides a system for managing a communication link, the system comprising a processor configured to execute instructions to cause the system to: detect one or more indicators of an expected service interruption associated with at least one of: a communication link between a relay and a communication target; and a communication link between the relay and a first user equipment (UE); and cause a first message to be transmitted, the first message indicating that the expected service interruption is expected to occur; the first message causing the first UE to initiate one or more actions to reduce or avoid the expected service interruption.

Figure 1:
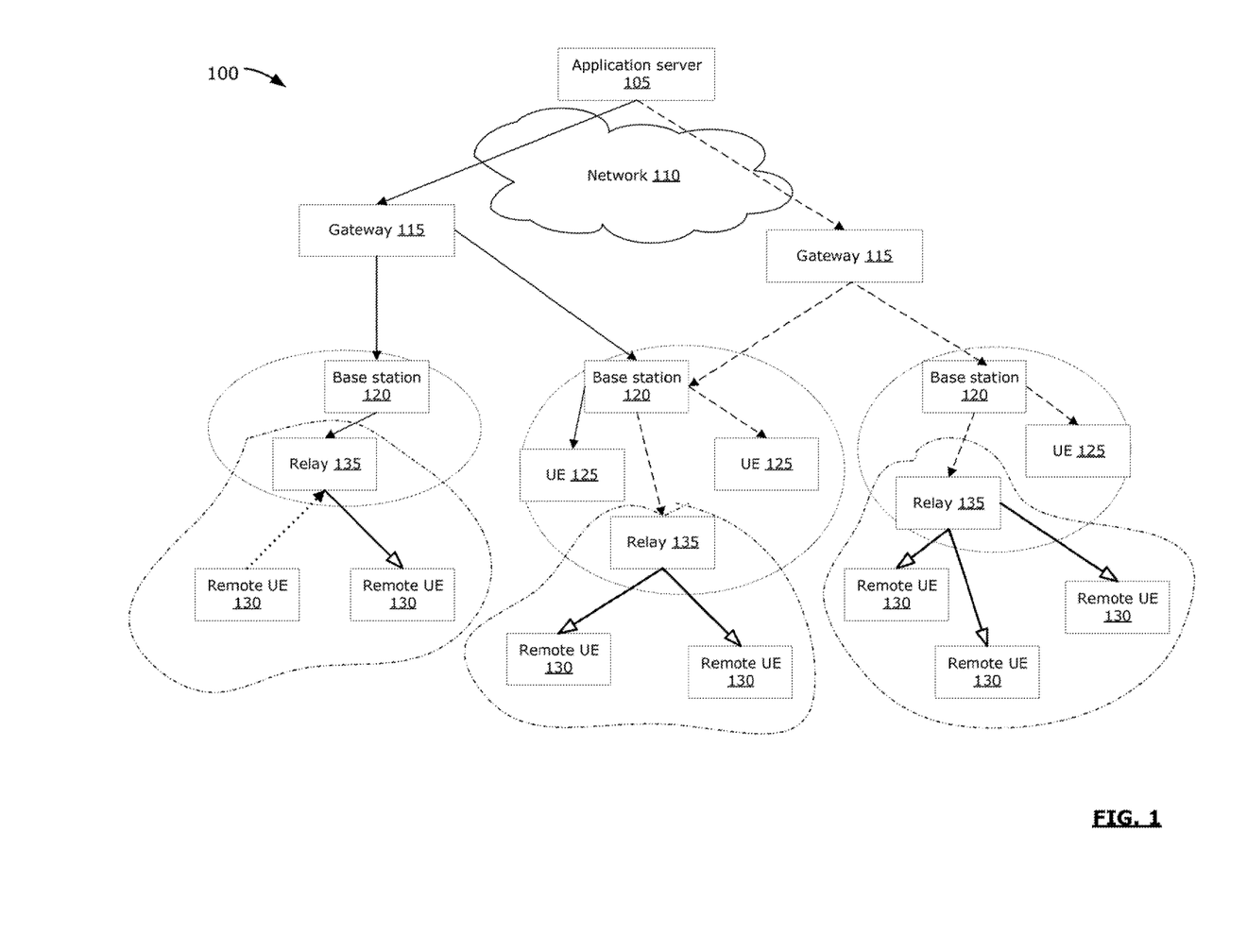
FIG. 1 is a schematic diagram illustrating an example system including example relays.

FIG. 1 is a schematic diagram of an example system, in which relays are used to provide ProSe services to remote UEs. The system 100 may include an application server 105, such as a Group Communication Service Application Server (GCS AS), which may function as the MCPTT application server and provide MCPTT services. The application server 105 may receive and transmit communications via a network 110, which may be an IP-based communication network. Communications in the network 100 may include multicast (i.e., point-to-multipoint) and/or unicast (i.e., point-to-point) transmission types. Communications to and from the application server 105 may be passed through one or more gateways 115, such as a Public Data Network gateway (PDN GW), a Broadcast Multicast Service Center (BM-SC), and/ or a Multimedia Broadcast Multicast Services gateway (MBMS GW). The gateway 115 may in turn transmit/receive communications to/from one or more base stations 120, such as an Evolved Node B (eNB, also referred to as an E-UTRAN Node B).

The application server 105, gateway(s) 115 and base station(s) 120 may be collectively referred to as the network. The network may provide MCPTT services to UEs 125 that are within radio coverage of one or more base stations 120. UEs 125 having this direct service may operate in a mode referred to as Network Mode Operation (NMO). One or more remote UEs 130 (i.e., UEs which are outside of network coverage) may receive MCPTT services via an associated relay 135 (such as a UNR, which is itself a UE within coverage of the network), in a mode referred to as Network Mode Operation via Relay (NMO-R).

In FIG. 1, solid arrows indicate unicast transmissions from the network to in-coverage UEs 125, 135 over a Uu channel, dashed arrows indicate multicast or broadcast (e.g., MBMS) transmissions from the network to in-coverage UEs 125, 135 over a Uu channel, open arrows indicate downlink transmissions from a relay 135 to a remote UE 130 in a relay over UE-to-UE radio interface (e.g., PC5), and dotted arrows indicate uplink transmissions from a remote UE 130 to a relay 135 over UE-to-UE radio interface. Dotted lines about a base station 120 represents service coverage provided by that base station 120. Dotted lines about a relay 135 indicate the relay coverage provided by that relay 135.

The relay 135 may be used for extending network coverage for
MCPTT and other services. The relay 135 is able to connect one or more associated remote UEs 130 to the network. The relay 135 then relays downlink (i.e., network-to-UE) and uplink (i.e., UE-to-network) transmissions over the ProSe UE-to-UE sidelink radio interface (e.g., using PC5) to its associated remote UE(s) 130. Thus, ProSe relays 135 may enable coverage extension for network-based services, thereby enabling remote UEs 130 to receive the services (e.g., MCPTT services) provided by the network.

In some examples, the relay 135 may relay network communications to one or more UEs 125 that are within coverage of the network. This may be useful when a UE 125 is transitioning or recently transitioned from out of network coverage to within network coverage, for example. It may also be useful to use the relay 135 for in-coverage UEs 125 in situations where network resources are congested, in order to reduce the number of UEs to which the network transmits, for example.

In some examples, the relay 135 may enable off-network MCPTT services by functioning as a ProSe UE-to-UE Relay (UUR), also referred to as Direct Mode Operation using Relay (DMO-R). In this mode of operation, there may be two or more remote UEs 130 associated with the relay 135. The remote UEs 130 may be out of each other's direct transmission range, but within the transmission range of a common relay 135. The remote UEs 130 may then communication with each other via the communication service provided by the relay 135. In some examples, only two UEs (e.g., the relay 135 and another remote UE 130) may be communicating between each other (e.g., without network coverage) and in this scenario, the communication mode may be referred to as Direct Mode Operation (DMO). In some examples, the relay 135 may be within coverage of the network, in which case the relay 135 may also function as a UNR. In other examples, the relay 135 may be outside of network coverage, in which case the relay 135 may itself be a remote UE.

Figure 2:
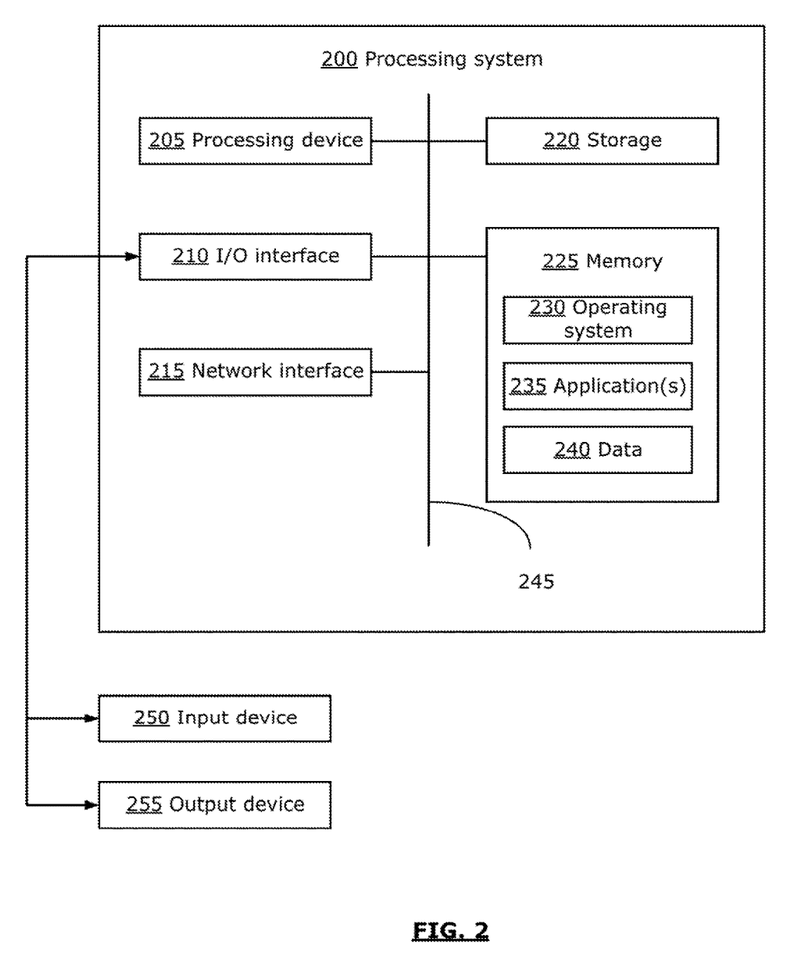
FIG. 2 is a schematic diagram of an example processing unit that may be suitable for implementing examples of the present disclosure.

FIG. 2 is a schematic diagram of an example processing system 200, which may be used to implement the methods and systems disclosed herein, such as the example base station 120, UEs 125, 130 and relays 135, and the example methods described below. The processing system 200 may be a server or a mobile device, for example, or any suitable processing system. Other processing systems suitable for implementing the present disclosure may be used, which may include components different from those discussed below. Although FIG. 2 shows a single instance of each component, there may be multiple instances of each component in the processing system 200.

The processing system 200 includes one or more processing devices 205, such as a processor, a microprocessor, an application-specific integrated circuit (ASIC), a field-programmable gate array (FPGA), a dedicated logic circuitry, or combinations thereof. The processing system 200 may also include one or more input/output (I/O) interfaces 210, which may enable interfacing with one or more appropriate input devices 250 and/or output devices 255. The processing system 200 includes one or more network interfaces 215 for wired or wireless communication with a network (e.g., an intranet, the Internet, a P2P network, a WAN, a LAN, and/or a Radio Access Network (RAN)). The network interface(s) 215 may include wired links (e.g., Ethernet cable) and/or wireless links for intra-network and/or inter-network communications. The network interface(s) 215 may provide wireless communication via one or more transmitters or transmit antennas and one or more receivers or receive antennas, for example. The processing system 200 may also include one or more storage units 220, which may include a mass storage unit such as a solid state drive, a hard disk drive, a magnetic disk drive and/or an optical disk drive.

The processing system 200 may include one or more memories 225, which may include a volatile or non-volatile memory (e.g., a flash memory, a random access memory (RAM), and/or a read-only memory (ROM)). The non-transitory memory(ies) 225 may store instructions for execution by the processing device(s) 205, such as to carry out the present disclosure. The memory(ies) 225 may include other software instructions, such as for implementing an operating system 230 and other application(s)/function(s) 235. The memory(ies) 225 may also contain data 240, which may be accessed by other components of the processing system 200. In some examples, one or more data sets and/or modules) may be provided by an external memory (e.g., an external drive in wired or wireless communication with the processing system 200) or may be provided by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage.

There may be a bus 245 providing communication among components of the processing system 200, including the processing device(s) 205, I/O interface(s) 210, network interface(s) 215, storage unit(s) 220 and/or memory(ies) 225. The bus 245 may be any suitable bus architecture including, for example, a memory bus, a peripheral bus or a video bus.

In FIG. 2, the input device(s) 250 (e.g., a keyboard, a mouse, a microphone, a touchscreen, and/or a keypad) and output device(s) 255 (e.g., a display, a speaker and/or a printer) are shown as external to the processing system 200. In other examples, one or more of the input device(s) 250 and/or the output device(s) 255 may be included as a component of the processing system 200.

As discussed above, the relay 135 may generally enable communication between one or more UEs and a communication target (e.g., the network, a communication system, or other entity such as other UE(s)). Depending on the mode of operation, the relay 135 may be referred to as a UNR and/or a UUR, for example. For simplicity, the following discussion refers to the example case where the communication target is the network (e.g., via a base station 120), in which the relay 135 may function as a UNR. However, it should be understood that the following discussion may be similarly applicable to cases where the communication target is another UE. In cases where the communication target is another UE, the relay 135 may function as a UUR, and only the condition(s) applicable to the communication links between the relay 135 and its associated remote UEs 130 may be relevant. The following discussion refers to the example case where the relay 135 serves one or more remote UEs 130. However, it should be understood that the relay 135 may additionally or alternatively serve one or more UEs 125 within coverage of the network. In this respect, the matters described hereafter in relation to remote UEs 130 may additionally or alternatively be equally applicable to in-coverage UEs 125.

In general, ProSe-capable devices (e.g. devices that support ProSe and MCPTT) are expected to be mobile. Even when the devices are not mobile, network coverage conditions may in general change over time which would result in UEs going in and out of network coverage. As such, a relay 135 may itself also move in and out of network coverage or may move from coverage by one base station 120 (e.g., a first eNB) to another base station 120 (e.g., another eNB). Since the relay 135 is responsible for providing network-based services to one or more remote UEs 130 associated with the relay 135, when the relay 135 suffers service interruption (e.g., due to mobility), this service interruption would affect the associated remote UEs 130 as well. Such service interruption would be undesirable, in particular when affecting public safety services which are time critical.

Since coverage extension is a feature provided by relays 135, a relay 135 itself may be very likely located towards the edge of coverage of the network, since this is the area where the relay 135 may be expected to serve a larger number of remote UEs 130 whilst also being within coverage of a base station 120. Thus, a relay 135 itself may be vulnerable to losing network service itself due to mobility of the relay 135 and/or changes in network conditions affecting coverage of the base station 120. When the relay 135 completely loses service from the network, all remote UEs 130 associated with the relay 135 also lose network service at this point. Even if the remote UEs 130 are able to regain coverage by associating with another relay 135, there is still a service interruption, which may not be desirable for time-critical public safety applications (e.g., MCPTT).

Another cause of service interruption may be movement of the relay 135 between base stations 120 (and the associated handover procedure). As well, the relay 135 may be vulnerable to changing conditions on the radio interface with the base station 120, which may result in the relay 135 initiating reestablishment procedures with the base station 120 (e.g., due to handover failures or due to fluctuations in serving cell radio link quality). Again, these situations may result in service interruption and/or temporary latency to the services that the relay 135 relays to its associated remote UEs 130, which again may be undesirable, especially for public safety services.

Service interruptions may also be caused by conditions in the relay 135 itself. The relay 135, even if it remains in good radio conditions with the network, may enter a state where it may be unable to sustain sidelink operations with its associated remote UEs 130. This may for instance happen when the relay 135 enters a low battery state, when its transmission capabilities are deactivated or impaired, or the device is deactivated for any reason. Again, the resulting service interruption may be undesirable, especially for public safety services.

In various examples, the present disclosure may help to mitigate or avoid such service interruptions. This may be done by detecting when a service interruption is expected or likely to occur (e.g., by detecting one or more trigger conditions), then informing the appropriate entity (e.g., remote UEs 130, base station 120 and/or relay 135) of the expected service interruption and/or the detected trigger condition(s). This may be carried out prior to actual occurrence of the event causing the service interruption, which may enable reduction or minimization of service interruption. As will be described in the examples provided below, the expected service interruption may be detected by the base station 120, the relay 135, the remote UEs 130, or a combination thereof.

Figure 3A:
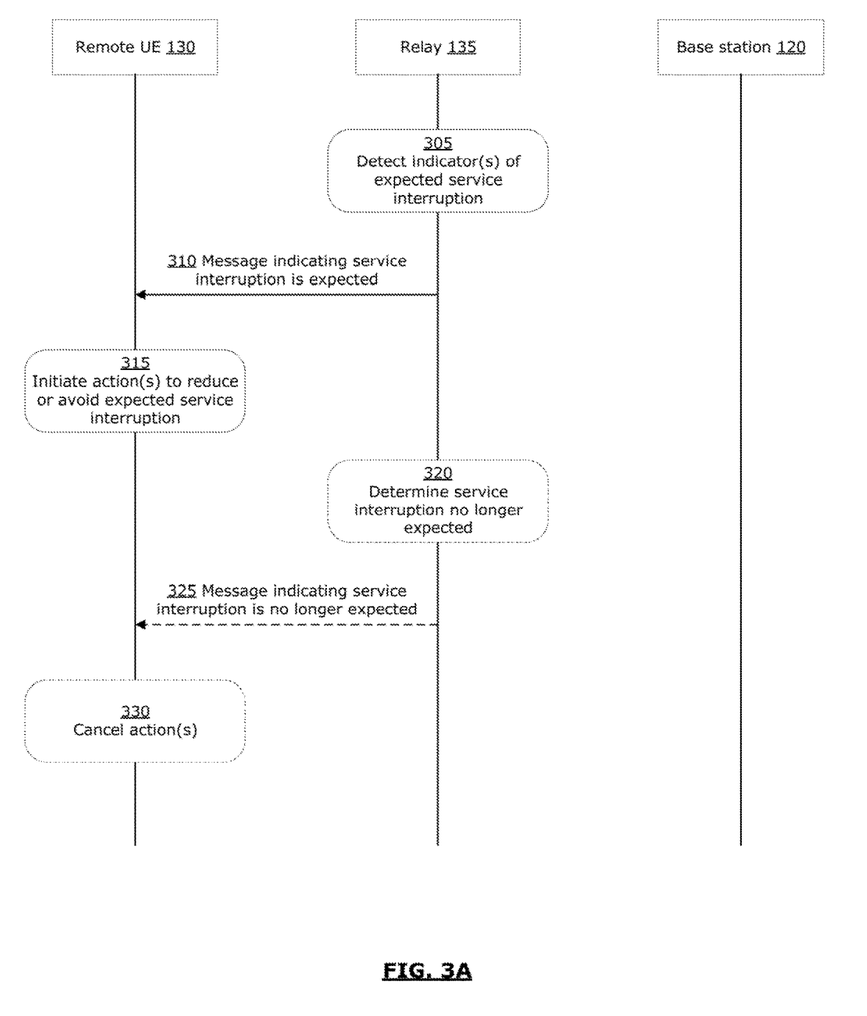
FIG. 3A is a signaling diagram illustrating an example method for managing a communication link, wherein an indicator of expected service interruption may be identified by the relay.

FIG. 3A is a signaling diagram illustrating an example method for managing a communication link, in which the indicator(s) of an expected service interruption is detected by the relay 135. Although FIG. 3A shows a single remote UE 130 and is described with respect to a single remote UE 130, the signaling may be extended to all remote UEs 130 associated with the relay 135. As previously described, the relay 135 may be in communication with the base station 120 over a Uu link, and may be in communication with the UE 130 over sidelink channels over a PC5 link, for example.

At 305, the relay 135 may detect one or more indicators of an expected service interruption associated with at least one of the communication links, namely at least one of the communication link between the relay 135 and the base station 120 (or more generally the network) and the communication link between the relay 135 and the remote UE 130.

The indicator(s) that may be detected by the relay 135 may include indicator(s) related to the communication link between the relay 135 and the base station 120 (or more generally the network). This may include detection of degradation of the radio link on the Uu interface, for example a measure of serving cell quality (e.g., reference signal received power (RSRP), reference signal received quality (RSRQ) or channel quality indicator (CQI)) dropping below a predetermined threshold. The relay 135 may also detect that radio link failure (RLF) is imminent (e.g., receipt of at least a predetermined number of out-of-sync indications, or a timer indicative of imminent radio link failure is active). The relay 135 may also detect that the service quality of the radio link quality or strength on the Uu interface or the PC5 interface has degraded below a predetermined threshold (e.g., an application or underlying protocol such as packet data convergence protocol (PDCP) or radio link control (RLC) detects that the quality of the received service has degraded below a predetermined threshold, detection of a predetermined amount (e.g., predetermined number or percentage) of missed or un-decoded voice frames, data frames or packets pertaining to a media, or detection that other key parameters such as an error rate, such as the residual bit error rate on the application packets, has exceeded a predetermined threshold). The relay 135 may also detect that it is at an edge of coverage by the network (e.g., detection of service degradation while also determining there is no suitable neighbor cell that can provide the service of interest and/or detected based on neighbor cell measurements). The relay 135 may determine that none of the detected cells, including the serving cells and neighbor cells on the measured frequencies, have good quality service (e.g., the received power of the cells may be below a predetermined threshold). Other example indicators detectable by the relay 135 may include a drop in throughput on the Uu link or the PC5 link below a predetermined threshold, a loss of one or more network services from the serving cell (and possibly other neighbor cells which might be candidates for handover), and a trigger of a handover by the base station 120 or of a reestablishment by one or more associated UEs 130, among others. For the above quality/strength measurements, degradation may be detected if a measurement drops below a predetermined quality threshold. The predetermined threshold(s) may be set according to standards, manually set and/or preconfigured in the relay 135 (e.g., preconfigured in the universal integrated circuit card (UICC), for example.

The indicator(s) that may be detected by the relay 135 may also include indicator(s) related to local conditions at the relay 135, and which may not be related to the communication link between the relay 135 and the network. For example, the relay 135 may detect that the relay 135 is entering a state unable to maintain the communication link with the UE 130. Such a state may include, for example, battery power of the relay 135 falling below a predetermined threshold, processing power of the relay 135 below a predetermined threshold, the relay 135 having received instructions (e.g., from the user or from higher layers) to turn off power or stop relay mode of operation, the relay 135 stopping relay of certain services (e.g., due to higher layer input or user intervention), relay 135 being overloaded, and the distance of separation or the relative velocity between the relay 135 and the UE 130 being greater than a predetermined threshold, among others. Such local conditions at the relay 135 may impact the ability of the relay 135 to provide the required service(s) over the PC5 link.

At 310, the relay 135 may transmit a message to the remote UE 130 indicating that a service interruption is expected to occur. For example, this message may be transmitted prior to actual occurrence of the service interruption, and may be transmitted before the service degradation is noticeable by the remote UE 130. This message may be transmitted to all remote UEs 130 associated with the relay 135, in which case the message may be a broadcast or multicast message on a sidelink channel. In other examples, the message may be transmitted to only those remote UEs 130 which may be affected. Although not shown, in some examples the relay 135 may transmit the same or similar message to the base station 120, which may enable the base station 120 to initiate appropriate measures to reduce service interruption at remote UEs, for example by setting up a new relay as described further below.

The transmitted message may include information indicating the indicator(s) of expected service interruption that was detected by the relay 135. In some examples, if the relay 135 is aware of one or more other relays in its proximity (e.g., discovered by direct discovery by the relay 135 or identified by the base station 120), information about the other relay(s) may be included in the message. This information about other relay(s) may be used by the remote UE 130 in discovering and associating with a target relay, as described further below.

Figure 3B:
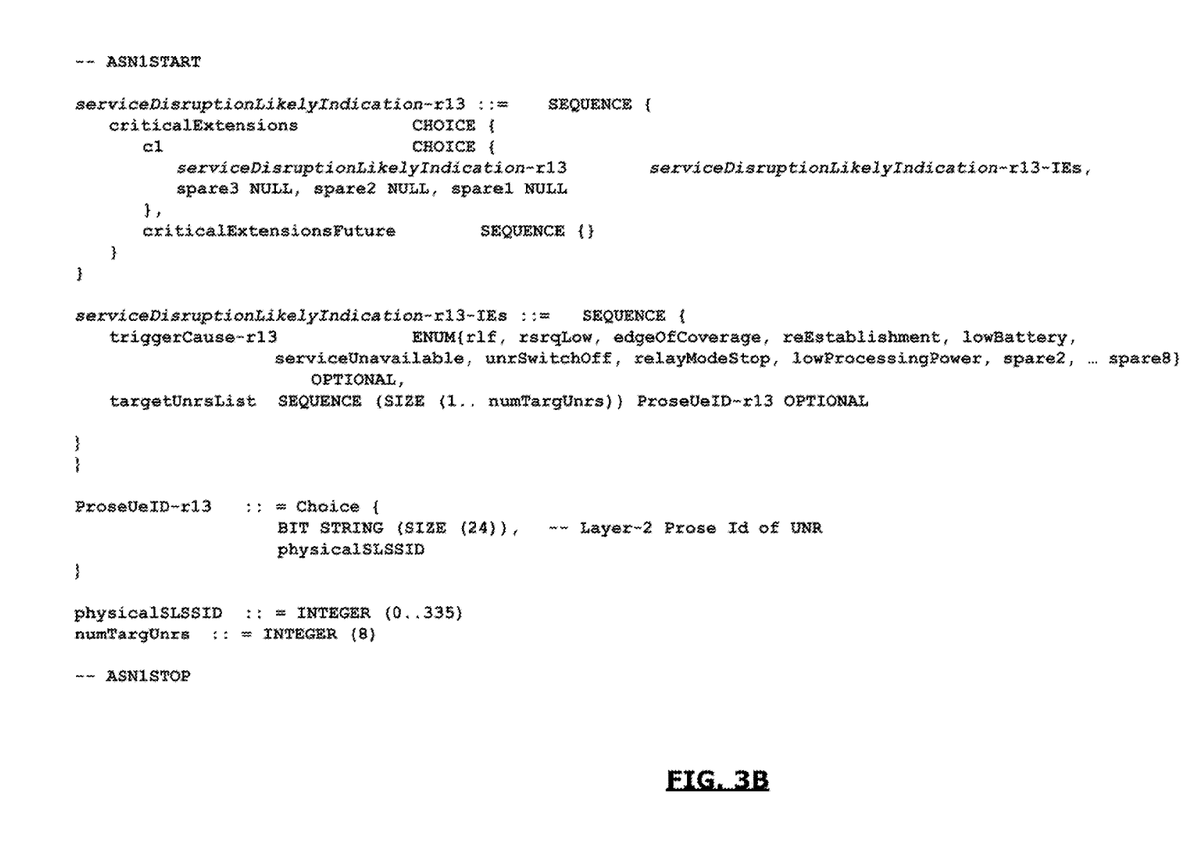
FIG. 3B is an example message that may be transmitted to indicate an expected service interruption.

An example of the transmitted message at 310 is provided in FIG. 3B, in Abstract Syntax Notation One (ASN.1) notation language. In this example, the message may be denoted as serviceDisruptionLikelyIndication (the message may alternatively be denoted as serviceDisruptionLikelyToOccur, serviceDisruptionExpectedIndication, or other appropriate names, for example), and the example fields may include:

triggerCause_—indicates the cause for initiating the message. Values may include: rlf (RLF is imminent); rsrqLow (RSRQ of serving cell is below a predetermined threshold); edgeOfCoverage (serving cell quality is below a predetermined threshold whilst no suitable neighbor cell found); reestablishment (Reestablishment procedure initiated by the relay); lowBattery (battery level of the relay is below a predetermined threshold); serviceUnavailable (sidelink service is unavailable); unrSwitchOff (relay is being switched off); and relayModeStop (relay has been reconfigured to stop acting as a relay). Other values may be possible.

targetUnrList—indicates a list of other relay(s) ProSe UE identity (e.g., the destination which is identified by the ProSe Layer-2 ID as specified in 3GPP TS 23.303) which may be used by the remote UE 130 to reselect a relay for service continuity reasons. This also may indicate the physical layer sidelink synchronization identity of the other relay.

The transmitted message may cause the remote UE 130, at 315, to initiate one or more actions to reduce or avoid the expected service interruption. The possible action(s) by the remote UE 130 will be described further below, with reference to FIG. 6.

In some cases, conditions may improve such that service interruption is not longer expected. At 320, the relay 135 may determine that the previously expected service interruption is no longer expected. For example, the relay 135 may detect that the indicator(s) detected at 305 is(are) no longer valid (e.g., the Uu link quality has improved or handover was successful).

If so, at 325, the relay 135 may transmit a subsequent message to the remote UE 130 indicating that the service interruption is no longer expected. In some examples, this subsequent message may include information indicating the reason why service interruption is no longer expected. This message may also be transmitted to the base station 120 (e.g., if the first message indicating expected service interruption was also transmitted to the base station 120 at 305).

This subsequent message may cause the remote UE 130, at 330, to cancel the action(s) that it had initiated at 315. If the remote UE 130 had already completed the action(s) and had already disassociated from the relay 135 (e.g., as discussed further below with reference to FIG. 6), the remote UE 130 may not receive this subsequent message or may ignore this subsequent message.

Figure 4:
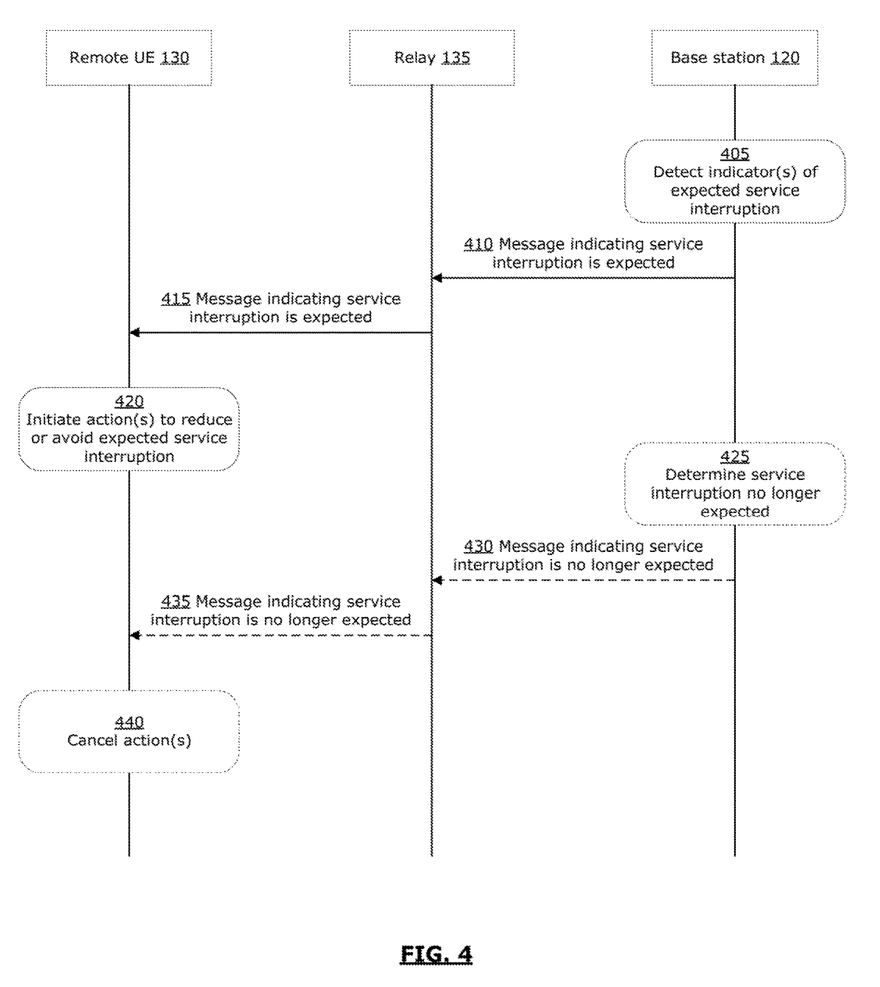
FIG. 4 is a signaling diagram illustrating an example method for managing a communication link, wherein an indicator of expected service interruption may be identified by the base station.

FIG. 4 is a signaling diagram illustrating an example method for managing a communication link, in which the indicator(s) of an expected service interruption is detected by the base station 120. Although FIG. 4 shows a single remote UE 130 and is described with respect to a single remote UE 130, the signaling may be extended to all remote UEs 130 associated with the relay 135. As previously described, the relay 135 may be in communication with the base station 120 over a Uu link, and may be in communication with the UE 130 over a PC5 link, for example.

At 405, the base station 120 may detect one or more indicators of an expected service interruption associated with at least one of the communication links, namely at least one of the communication link between the relay 135 and the base station 120 (or more generally the network) and the communication link between the relay 135 and the remote UE 130.

The indicator(s) detected by the base station 120 may include those detectable by the relay 135, as described above with respect to FIG. 3A. For example, the indicator(s) detected by the base station 120 may include indication that the Uu link quality is below a predetermined threshold, indication that the base station 120 has initiated or is about to initiate the handover phase for the relay 135, and receipt of a reestablishment request from the relay 135, among others. The indicator(s) detected by the base station 120 may also include indicator(s) of conditions local to the relay 135, in which case information about the local conditions may be provided to the base station 120 by the relay 135 itself, for example in a message from the relay 135 to the base station 120 (not shown) prior to detection of the indicator(s) by the base station 120.

At 410, the base station 120 may transmit a message to the relay 135 indicating that a service interruption is expected to occur. For example, this message may be transmitted prior to actual occurrence of the service interruption, and may be transmitted before the service degradation is noticeable by the relay 135 and/or the remote UE 130. This transmitted message may be similar to that described above with respect to FIG. 3A (e.g., the example serviceDisruptionLikelyIndication message).

In some examples, the base station 120 may identify one or more UEs in its coverage area suitable to serve as a new relay, and, if the UE is not already functioning as a relay, may instruct reconfiguration of the identified UE(s) to serve as a new relay. Information about the identified target relay(s) may be included in the transmitted message, for example as described above with respect to FIG. 3A.

The message transmitted by the base station 120 may cause the relay 135, at 415, to relay the same message or transmit a similar message to the remote UE 130, indicating that a service interruption is expected. For example, the message transmitted by the base station 120 at 410 may include instructions to cause the relay 135 to propagate the message over sidelink channels over a PC5 interface to all associated remote UEs 130, or to those remote UEs 130 which may be affected. The message from the base station 120 may also identify the remote UE(s) 130 to which the message should be propagated.

The transmitted message may cause the remote UE 130, at 420, to initiate one or more actions to reduce or avoid the expected service interruption. The possible action(s) by the remote UE 130 will be described further below, with reference to FIG. 6.

In some cases, conditions may improve such that service interruption is not longer expected. At 425, the base station 120 may determine that the previously expected service interruption is no longer expected. For example, the base station 120 may detect that the indicator(s) detected at 405 is no longer valid (e.g., the Uu link quality has improved the relay 135 informs the base station 120 that its local conditions have improved).

If so, at 430, the base station 120 may transmit a subsequent message to the remote relay 135 indicating that the service interruption is no longer expected. In some examples, this subsequent message may include information indicating the reason why service interruption is no longer expected.

The subsequent message may cause the relay 135, at 435, to transmit the same or similar message to the remote UE 130, indicating that service interruption is no longer expected. For example, the message transmitted by the base station 120 at 430 may include instructions to cause the relay 135 to propagate the message over a sidelink channel to the remote UE 130.

This subsequent message may cause the remote UE 130, at 440, to cancel the action(s) that it had initiated at 420. If the remote UE 130 had already completed the action(s) and had already disassociated from the relay 135 (e.g., as discussed further below with reference to FIG. 6), the remote UE 130 may not receive this subsequent message or may ignore this subsequent message.

Figure 5A:
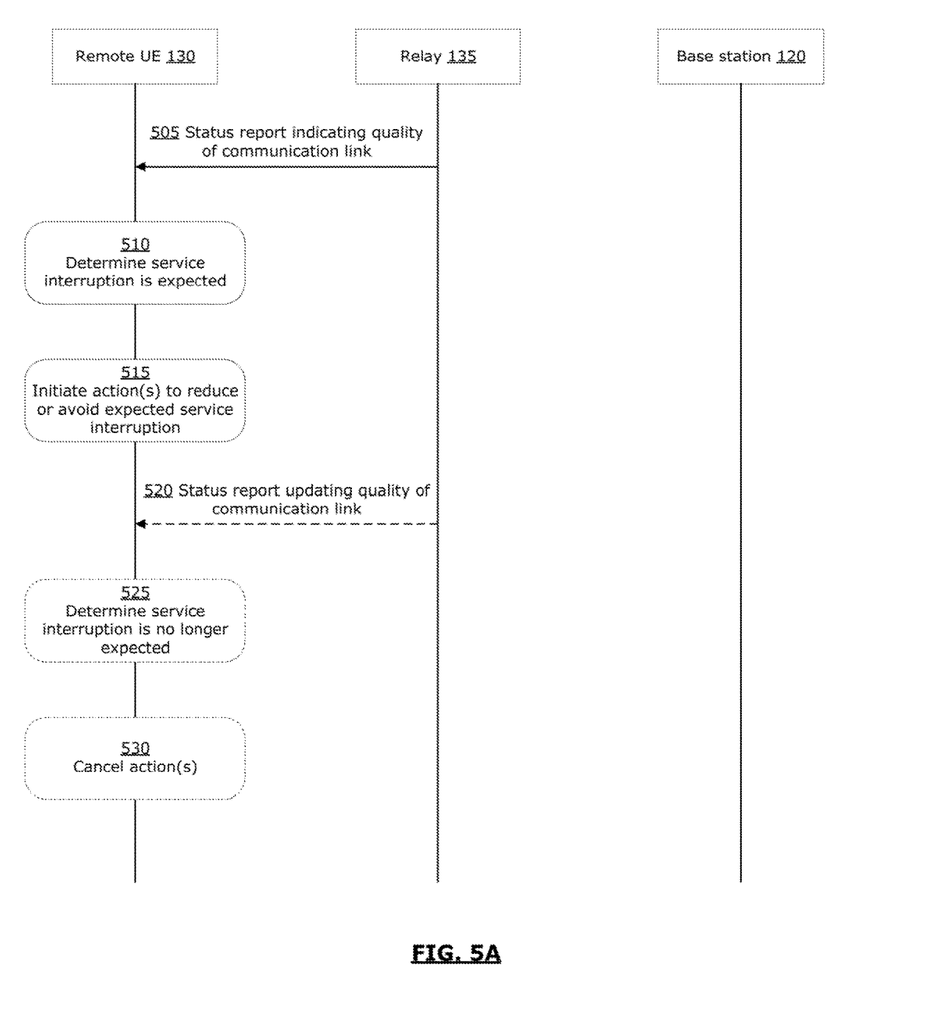
FIG. 5A is a signaling diagram illustrating an example method for managing a communication link, wherein an indicator of expected service interruption may be identified by the UE.

FIG. 5A is a signaling diagram illustrating an example method for managing a communication link, in which the indicator(s) of an expected service interruption is detected by the remote UE 130. Although FIG. 5A shows a single remote UE 130 and is described with respect to a single remote UE 130, the signaling may be extended to all remote UEs 130 associated with the relay 135. As previously described, the relay 135 may be in communication with the base station 120 over a Uu link, and may be in communication with the UE 130 over a sidelink channel.

At 505, the relay 135 may transmit a status report to the remote UE 130 providing information indicating the quality of the communication links and/or indicating one or more parameters which may impact the quality of the communication links, such as local conditions at the relay 135 and/or other parameters, for example as described below. The communication links about which information is provided may include at least one of the communication link between the relay 135 and the base station 120 (or more generally the network) and the communication link between the relay 135 and the remote UE 130. The status report may be transmitted automatically by the relay 135, at intervals (which may be variable, for example depending on the quality of the communication link, such as greater frequency as the quality decreases), transmitted in response to changes in communication link conditions (e.g., only if a parameter related to quality of a communication link falls below a predetermined threshold), or as instructed by the base station 120, for example.

Information provided in the status report may include information related to any of the indicators described above with respect to FIG. 3A (e.g., including Uu-related parameters as well as parameters local to the relay 135).

Figure 5B:
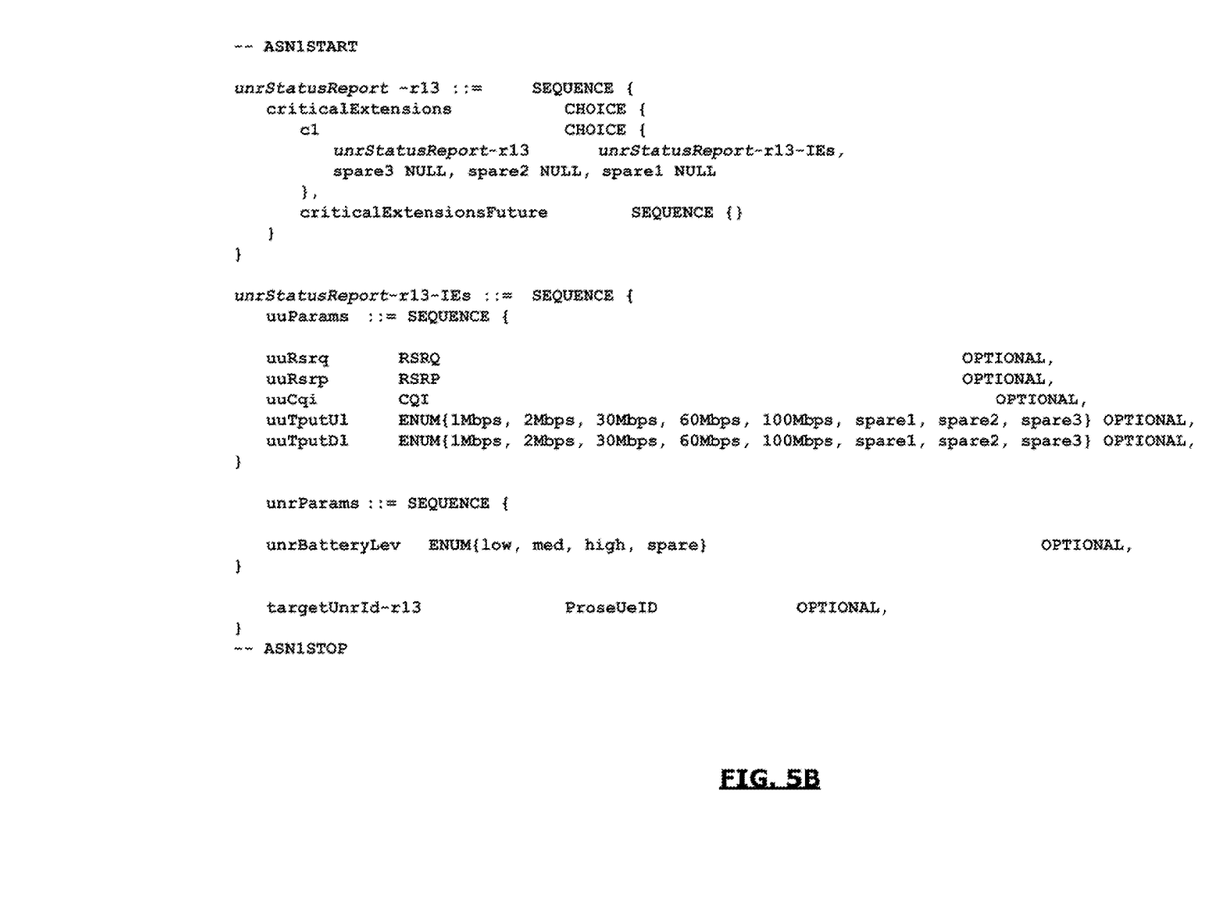
FIG. 5B is an example status report message that may be transmitted to a UE.

An example of the status report transmitted at 505 is provided in FIG. 5B, in ASN.1 notation language. In this example, the message may be denoted as unrStatusReport, and the example fields may include:

uuRsrq—indicates the measured RSRQ over the Uu link
uuRsrp—indicates the measured RSRP over the Uu link
uuCqi—indicates the measured CQI over the Uu link
uuTputUl—indicates the measured throughput over the Uu in uplink direction
uuTputDl—indicates the measured throughput over the Uu in downlink direction
unrBatteryLev—indicates the battery level at the relay
targetUnrId—indicates the Prose layer 2 ID of one or more UEs which may be reselected and used as a relay by the remote UEs for service continuity purposes At 510, the remote UE 130 may determine whether a service interruption is expected. This determination may be made based on the information provided in the status report. For example, if at least one parameter included in the status report falls below a predetermined or preconfigured threshold and/or fails to satisfy a predetermined or preconfigured criterion. The predetermined threshold may define a value for a quality measure (e.g., the measured RSRQ, measured RSRP, measured CQI, etc.) below which a service interruption is determined to be expected, for example. The predetermined threshold(s) and/or predetermined criterion(a) may be pre-coded into each remote UE 130 or may be specified in the specifications, for example.

In some examples, each remote UE 130 may define its own set of threshold(s) and/or criterion(a) for determining whether a service interruption is expected. For example, a remote UE 130 that is considered to be of higher priority or considered to be more time sensitive may define threshold(s) and/or criterion(a) that will determine a service interruption is expected in conditions that may be tolerated (and thus not determined to be indicative of an expected service interruption) by a lower priority or less time sensitive remote UE 130. In some examples, the threshold(s) and/or criterion(a) may be defined based on the application or service being served over the communication link. For example, if the application being served to the remote UE 130 is highly delay sensitive or otherwise sensitive to service interruptions (e.g., real-time voice or video transmissions for mission critical applications), the threshold(s) and/or criterion(a) may be set to be less tolerant to service degradations (e.g., higher threshold(s)), compared to another service that may be more delay tolerant (e.g., offline file download).

Thus, each remote UE 130 may make its own determination of whether a service interruption is expected and may, accordingly, take appropriate action(s), at different points in time, in response to the same set of information in the status report.

At 515, when it is determined that at least one parameter is below a predetermined threshold and/or fails to satisfy a predetermined criterion, the remote UE 130 may initiate one or more actions to reduce or avoid the expected service interruption. The possible action(s) by the remote UE 130 will be described further below, with reference to FIG. 6.

In some examples, if the remote UE 130 has not yet disassociated from the relay 135, the relay 135 may continue to transmit status reports to the remote UE 130 even after the UE 130 has initiated the action(s) to reduce or avoid the expected service interruption.

In some cases, conditions may improve such that service interruption is no longer expected. At 520, a status report from the relay 135 may include updated information.

At 525, the remote UE 130 may determine that the updated information indicates that the service interruption is no longer expected. For example, the updated information may include an updated parameter that is no longer below the predetermined threshold or that now satisfies the predetermined criterion (e.g., a measure of the Uu link quality has increased).

Similarly to 510, the determination that the service interruption is no longer expected may be carried out individually by each remote UE 130, according to individually set threshold(s) and/or criterion(a). Accordingly, a less delay sensitive remote UE 130 may determine that the service interruption is no longer expected while a more delay sensitive remote UE 130 may not.

If the service interruption is determined to be no longer expected, the remote UE 130, at 530, may cancel the action(s) that it had initiated at 515. If the remote UE 130 had already completed the action(s) and had already disassociated from the relay 135 (e.g., as discussed further below with reference to FIG. 6), the remote UE 130 may not receive the updated status report transmitted at 520 or may ignore the updated status report.

Figure 6:
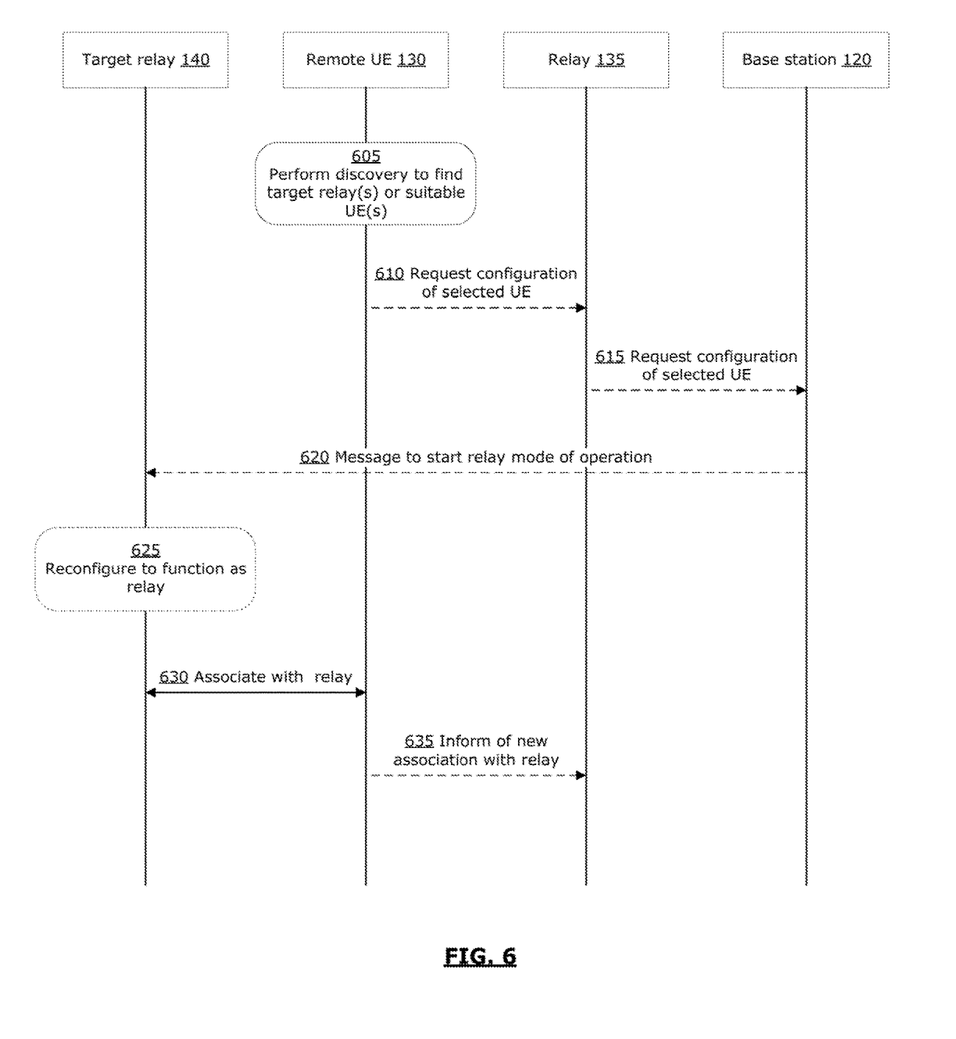
FIG. 6 is a signaling diagram illustrating an example action to reduce or avoid an expected service interruption.

FIG. 6 is a signaling diagram illustrating example action(s) that may be taken by a remote UE 130 to reduce or avoid an expected service interruption. In this example, the remote UE 130 takes action to attempt to associate with a target relay 140, in order to reduce or avoid the expected service interruption at its current relay 135.

At 605, the remote UE 130 may perform discovery (e.g., ProSe direct discovery) to find one or more target relays and/or suitable UEs that might potentially operate as a relay or that can be configured to operate as a relay. In some examples, discovery to find target relays and discovery to find suitable UEs that might potentially operate as a relay or that can be configured to operate as a relay may be performed independently. In some examples, information from the relay 135 and/or the base station 120 (e.g., information provided in the status report and/or provided in the transmitted message indicating an expected service interruption, as described above) may be used by the remote UE 130 to prioritize discovery and/or selection of a target relay or suitable UE. For example, details such as the physical SLSSID or ProSE UE ID of a suitable UE may be provided to the remote UE 130. In some examples, any nearby relay may be configured to broadcast relay-related parameters (e.g., synchronization signals identifying itself as a relay, for example one or more values or a range of pre-configured physical-layer side-link synchronization identity(ies) such as SSID), which may help to improve efficiency of the discovery. For example, a relay may broadcast such information in the sidelink master information block (MIB-SL), which may help the remote UE 130 to more efficiently identify and select a target relay. The MIB-SL may provide information generally applicable for direct discovery of relays. The MIB-SL may also contain other information about the relay, such as a list of MCPTT groups which the relay is currently serving and a list of APNs to which the relay is currently forwarding traffic, for example. In some examples, any UE discoverable by the remote UE 130 might potentially operate as a relay or can be configured to operate as a relay. In some examples, only some UEs discoverable by the remote UE 130 might potentially operate as a relay or can be configured to operate as a relay. In some examples, any UE pertaining to the same group (e.g. an MCPTT group) as the remote UE 130, might potentially operate as a relay or can be configured to operate as a relay.

If one or more target relays and/or suitable UEs are found, the remote UE 130 may select one target relay or suitable UE to serve as its new relay. In some examples, selection of the one target relay or suitable UE may be based on information provided by the message (e.g., a serviceDisruptionLikelyIndication message) from the current relay 135 that indicated the expected service interruption.

In some cases, the remote UE 130 may select a suitable UE that is not yet configured to operate as a relay. For example, there may be no nearby UEs that are already configured as relays, or the discovered nearby relays are unable to provide the service required by the remote UE 130. In such a case, the remote UE 130 may, at 610, transmit a request to its current relay 135 requesting configuration of the selected UE to serve as a new relay.

At 615, the current relay 135 may transmit the request for configuration of a new relay to the base station 120.

At 620, the base station 120 may transmit a message to the selected UE to cause the UE to begin the relay mode of operation.

The message from the base station 120 may cause the selected UE, at 625, to begin operation as a relay.

At 630, after the target relay 140 has been selected by the remote UE 130 (and optionally after configuration of a suitable UE to operate as a relay, if applicable) the remote UE 130 and the target relay 140 may undertake appropriate interactions to cause the remote UE 130 to associate with the target relay 140. This may include the remote UE 130 disassociating from its previous relay 135.

Optionally, at 635, after the remote UE 130 successfully associates with the relay 140, the remote UE 130 may inform the previous relay 135 of the association with the relay 140. This information may be used by the previous relay 135 to update its list of currently associated UEs, for example.

The action(s) performed by the remote UE 130, as described with reference to FIG. 6, may be cancelled at any time if the remote UE 130 receives a message indicating that service interruption at its current relay 135 is no longer expected or if the remote UE 130 determines that service interruption at its current relay 135 is no longer expected.

Figure 7:
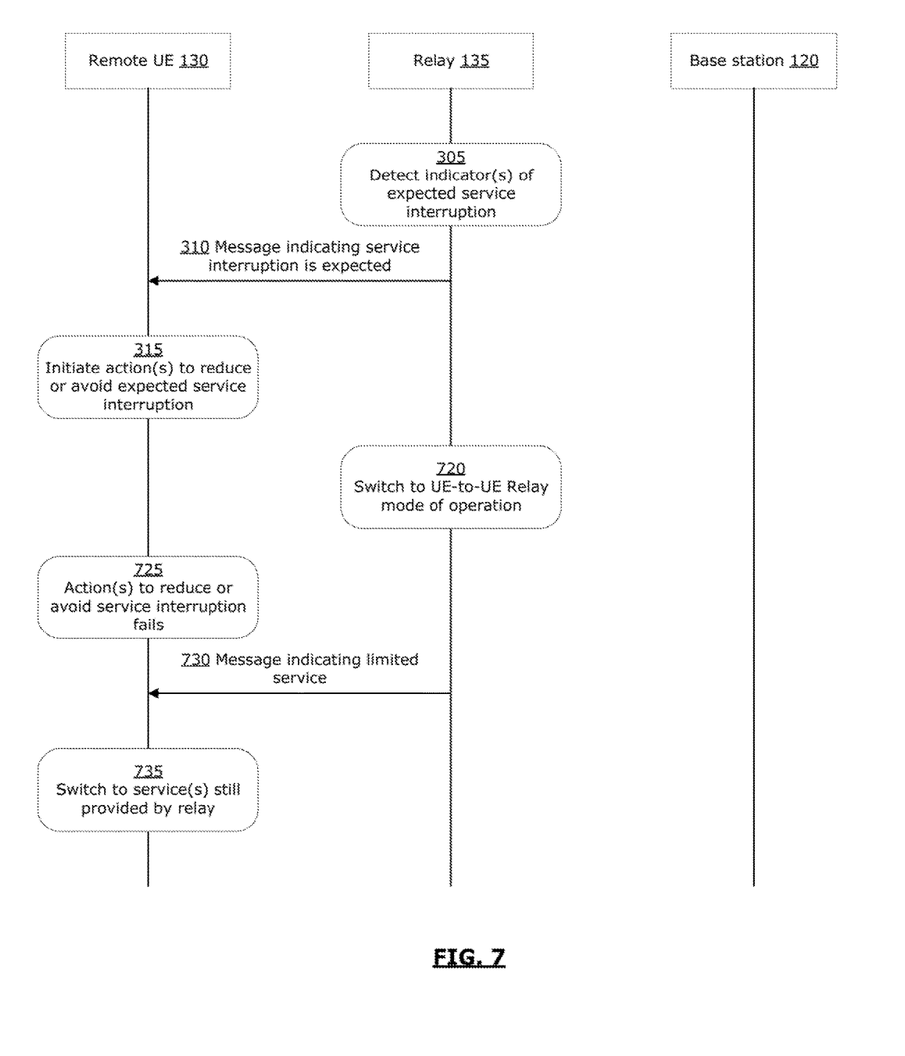
FIG. 7 is a signaling diagram illustrating an example method for managing a communication link, wherein a relay switches to operation as a UUR.

In some examples, the remote UE 130 may not associate with another relay prior to actual service interruption at its current relay 135. For example, the remote UE 130 may not find any target relay or suitable UE in its proximity. If the relay 135 loses network coverage and still has one or more remote UEs 130 associated to it, the relay 135 may enable DMO-R operation and become a UUR, for example. FIG. 7 is a signaling diagram illustrating an example method for managing a communication link, for the above-described scenario. Although FIG. 7 shows a single remote UE 130 and is described with respect to a single remote UE 130, the example method may apply to all remote UEs 130 associated with the relay 135 that do not associate with another relay prior to actual service interruption. As previously described, the relay 135 may be in communication with the base station 120 over a Uu link, and may be in communication with the UE 130 over sidelink channels over a PC5 link, for example.

The example method of FIG. 7 may include 305, 310 and 315, as described with respect to FIG. 3A above, for example.

At 720, the relay 135 may lose network coverage (e.g., loses communication with the base station 120). At this point, the relay 135 may switch to the UUR mode of operation if there are two or more remote UEs 130 still associated or linked in communication with the relay 135. Alternatively, the relay 135 may switch to a direct mode of operation (e.g., DMO), where the relay 135 directly communicates with the remote UE 130, if there is only one remote UE 130 still associated with the relay 135. In general, the relay 135 may function as a UUR or as a UE in direct mode of operation with a remote UE 130, depending on the number of remote UEs 130 that remain associated with the relay 135.

At 725, the action(s) initiated by the remote UE 130 to reduce or avoid the expected service interruption may fail. For example, the remote UE 130 may be unable to find a target relay or suitable UE to switch to. Accordingly, the remote UE 130 may remain associated with the relay 135. Although 725 is shown after 720, 725 may occur anytime after 315, and may occur prior to 720.

At 730, after the relay 135 switches to the UUR mode of operation or alternatively switches to a direct mode of operation, the relay 135 may transmit a message to any remote UEs 130 that are still associated, indicating that the relay 135 is in a limited service state. This message may indicate to the associated remote UE(s) 130 that the network-based service(s) is(are) no longer available. In some examples, this message may also indicate the service(s) that the relay 135 is still able to support. For example, to support public safety services, the relay 135 may, upon switching to operation as a UUR, start a new MCPTT server locally to facilitate communication among associated remote UEs 130 via the relay 135.

At 735, the remote UE 130 may switch to the service(s) that are still provided by the relay 135.

In some examples, the switch from operation as a UNR to operation as a UUR, the use of DMO-R mode instead of NMO-R mode and/or the switch to a direct mode of operation may require preauthorization and/or pre-configuration for the relay 135 and/or the remote UE 130.

The example method described above may enable the remote UEs 130 still in association with the relay 135 to maintain communication with each other (e.g., for local mission critical communications) even after the communication link between the relay 135 and the network fails. If, at a later time, the relay 135 regains network coverage, it may return to NMO-R operation and function as a UNR for its associated remote UEs 130.

The above discussions provide examples of the relay 135 initially operating as a UNR. However, it should be understood that the above discussions may be similarly applicable (e.g., with suitable modification) to cases where the relay 135 operates as a UUR from the start. In such a case, FIGS. 4 and 7 may not be applicable, and FIGS. 3A and 5A may be applicable with the modification that only the condition(s) relevant to the communication links between the relay 135 and its associated remote UE(s) 130 are considered.

Although the present disclosure describes methods and processes with steps in a certain order, one or more steps of the methods and processes may be omitted or altered as appropriate. One or more steps may take place in an order other than that in which they are described, as appropriate.

While the present disclosure is described, at least in part, in terms of methods, a person of ordinary skill in the art will understand that the present disclosure is also directed to the various components for performing at least some of the aspects and features of the described methods, be it by way of hardware components, software or any combination of the two, or in any other manner. Moreover, the present disclosure is also directed to a pre-recorded storage device or other similar non-transient computer readable medium including program instructions stored thereon for performing the methods described herein, including DVDs, CDs, volatile or non-volatile memories, or other storage media, for example.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, while the systems, devices and processes disclosed and shown herein may comprise a specific number of elements/components, the systems, devices and assemblies could be modified to include additional or fewer of such elements/components. For example, while any of the elements/components disclosed may be referenced as being singular, the embodiments disclosed herein could be modified to include a plurality of such elements/components. The subject matter described herein intends to cover and embrace all suitable changes in technology. All references mentioned are hereby incorporated by reference in their entirety.

The invention claimed is:

1. A method of reducing interruption of service, the method comprising:
   receiving, at a remote user equipment (UE) linked in communication with a first UE-to-network relay (UNR) and receiving a service via the first UNR, a first message from the first UNR, the first message causing the remote UE to initiate a discovery procedure to discover a new UNR to enable the remote UE to continue receiving the service, the first message including a cause code indicating a reason for sending the first message;
   wherein the discovery procedure is initiated to cause the remote UE to select a second UNR as the new UNR from a plurality of suitable UNRs to enable the service to be continued via the second UNR.

2. The method of claim 1, wherein the discovery procedure causes the remote UE to find the plurality of suitable UNRs.

3. The method of claim 1, wherein the second UNR is selected based on information provided by the first message.

4. The method of claim 3, wherein the first message includes an identifier (ID) of the second UNR.

5. The method of claim 1, further comprising:
   associating, by the remote UE, with the second UNR to continue receiving the service.

6. The method of claim 1, further comprising:
   transmitting, by the remote UE, a second message to the first UNR to indicate the remote UE has switched to the second UNR.

7. A method of reducing interruption of service, the method comprising:
   transmitting, by a first user equipment (UE)-to-network relay (UNR), a first message to a remote UE linked in communication with the first UNR and receiving a service via the first UNR, the first message causing the remote UE to initiate a discovery procedure to discover a new UNR to enable the remote UE to continue receiving the service, the first message including an indicator indicating a reason for sending the first message;
   wherein the remote UE is caused to initiate the discovery procedure to select a second UNR as the new UNR from a plurality of suitable UNRs to enable the service to be continued via the second UNR.

8. The method of claim 7, wherein the first message includes an identifier (ID) of the second UNR.

9. The method of claim 7, further comprising:
   receiving, at the first UNR, a second message from the UE, the second message indicating the remote UE has switched to the second UNR.

10. The method of claim 9, further comprising:
    after receiving the second message from the UE, updating, by the first UNR, information about UEs linked to the first UNR.

11. A user equipment (UE) comprising:
    a communication interface for wireless communication; and
    a processor configured to execute instructions to cause the UE to:
      receive a first message from a first UNR, the UE being linked in communication with the first UNR and receiving a service via the first UNR, the first message causing the UE to initiate a discovery procedure to discover a new UNR to enable the remote UE to continue receiving the service, the first message including a cause code indicating a reason for sending the first message;
    wherein the discovery procedure is initiated to cause the UE to select a second UNR as the new UNR from a plurality of suitable UNRs to enable the service to be continued via the second UNR.

12. The UE of claim 11, wherein the discovery procedure causes the UE to find the plurality of suitable UNRs.

13. The UE of claim 12, wherein the second UNR is selected based on information provided by the first message.

14. The UE of claim 13, wherein the first message includes an identifier (ID) of the second UNR.

15. The UE of claim 11, wherein the processor is further configured to execute instructions to cause the UE to:
    associate with the second UNR to continue receiving the service.

16. The UE of claim 11, wherein the processor is further configured to execute instructions to cause the UE to:
    transmit a second message to the first UNR to indicate the UE has switched to the second UNR.

17. A user equipment (UE)-to-network relay (UNR) comprising:
    a communication interface for wireless communication; and
    a processor configured to execute instructions to cause the UNR to:
      transmit a first message to a remote UE, the UNR being linked in communication with the remote UE and providing a service to the remote UE, the first message causing the remote UE to initiate a discovery procedure to discover a new UNR to enable the remote UE to continue receiving the service, the first message including an indicator indicating a reason for sending the first message;
    wherein the remote UE is caused to initiate the discovery procedure to select a second UNR as the new UNR from a plurality of suitable UNRs to enable the service to be continued via the second UNR.

18. The UNR of claim 17, wherein the first message includes an identifier (ID) of the second UNR.

19. The UNR of claim 17, wherein the processor is further configured to execute instructions to cause the UNR to:
    receive a second message from the UE, the second message indicating the remote UE has switched to the second UNR.

20. The UNR of claim 19, wherein the processor is further configured to execute instructions to cause the UNR to:
    after receiving the second message from the UE, updating information about UEs linked to the UNR.

* * * * *